United States Patent [19]

Kawulka et al.

[11] 3,867,268

[45] Feb. 18, 1975

[54] RECOVERY OF ZINC FROM ZINC SULPHIDES BY DIRECT PRESSURE LEACHING

[75] Inventors: Paul Kawulka; Walter J. Haffenden, both of Alberta; Vladimir N. Mackiw, Islington, Ontario, all of Canada

[73] Assignee: Gordon Sherritt Mines Limited, Toronto, Ontario, Canada

[22] Filed: Aug. 21, 1973

[21] Appl. No.: 387,833

[30] Foreign Application Priority Data
Nov. 20, 1972 Canada .............................. 157147

[52] U.S. Cl. .................. 204/119, 75/115, 75/120, 423/109, 423/140
[51] Int. Cl. ...................... C22d 1/22, C22b 19/22
[58] Field of Search ...... 75/115, 120, 104; 204/119; 423/140, 109

[56] References Cited
UNITED STATES PATENTS

| | | |
|---|---|---|
| 2,996,440 | 8/1961 | Forward et al. .................. 75/120 |
| 3,316,059 | 4/1967 | Vizsolyi et al. ..................... 75/115 |
| 3,477,927 | 11/1969 | Veltman et al. ..................... 75/120 |
| 3,642,435 | 2/1972 | Allen et al. ........................ 75/115 |

*Primary Examiner*—R. L. Andrews
*Attorney, Agent, or Firm*—Frank I. Piper; Arne I. Fors; James T. Wilbur

[57] ABSTRACT

Rapid and substantially complete extraction of zinc from zinc and iron containing sulphides is obtained by leaching the sulphides under oxidizing conditions at a temperature above the melting point of sulphur with an aqueous sulphuric acid solution containing at least the stoichiometric amount of acid required to combine with the zinc content of the sulphides as zinc sulphate and, also, containing an additive which is effective to prevent or at least substantially inhibit the molten sulphur from occluding unleached zinc sulphide particles thereby enabling the leaching reaction to continue until substantially all zinc values are extracted. Additives which are suitable for the process include lignins, lignosulphonates, tannin compounds, particularly quebracho, and other tree bark extracts, and alkylaryl sulphonates.

14 Claims, No Drawings

RECOVERY OF ZINC FROM ZINC SULPHIDES BY DIRECT PRESSURE LEACHING

This invention relates to a process for the extraction of zinc from zinc and iron-bearing sulphides and, more particularly, relates to a hydrometallurgical pressure leaching process for the separate recovery of zinc and elemental sulphur values from zinc sulphide ores and concentrates.

It is well known, as described in U.S. Pat. No. 2,996,440, to extract zinc from zinciferous mineral sulphides by reacting the sulphides with aqueous sulphuric acid in the presence of an oxygen bearing gas at elevated temperature and pressure. In the process of this patent, the sulphides, in finely divided form, are slurried in aqueous sulphuric acid solution containing free sulphuric acid in amount at least sufficient to combine with the zinc content of the sulphides to form zinc sulphate. The slurry is agitated and maintained at an elevated temperature below the melting point of sulphur under an overpressure of oxygen until extraction of zinc from the mineral sulphides and concurrent oxidation of sulphide sulphur associated with the zinc to elemental sulphur is substantially complete. The leach solution, after purification, is suitable for treatment by conventional procedures such as electrolysis for the recovery of product zinc, and the sulphur, which reports in the leach residue in elemental form, can be recovered therefrom as a by-product of the process.

According to this prior art process the leaching reaction is conducted at a temperature below the melting point of sulphur, i.e. below about 120°C. The temperature may optionally be raised above this point and up to about 175°C. after leaching is complete, but if temperatures above the melting point of sulphur are employed in the leaching step, elemental sulphur formed in the oxidation reaction is present in the slurry as liquid sulphur globules. Zinc sulphide particles in the slurry are "wetted" by these liquid sulphur globules and are occluded therein with the result that the particles are shielded from further oxidation and the sulphides leaching reaction comes to a standstill. While the use of a temperature below the melting point of sulphur in the leaching step avoids this problem, it has the disadvantage that the retention time required to effect substantially complete extraction of zinc values from the sulphides is undesirably prolonged.

U.S. Pat. No. 3,477,927 discloses the pressure leaching of zinciferous sulphides under oxidizing conditions at a temperature above the melting point of sulphur, i.e. above 120°C., in a slurry containing less sulphuric acid than that required to provide sulphate ions to combine as zinc sulphate with all the zinc contained in the sulphides. These conditions result in a rapid rate of reaction. For example, with appropriate adjustment of the acid and sulphides concentrations, with a retention time of about two hours a "target" zinc concentration of 150 g.p.l. in solution can be reached and the free acid and dissolved iron concentrations reduced to low values. The leach solution which is obtained is suitable for direct treatment in subsequent iron removal, purification and zinc electrowinning operations. In the preferred form of the process, the residue which contains elemental sulphur, unreacted sulphides and hydrated iron oxide is treated first to separate the elemental sulphur plus sulphides fraction from the hydrated iron oxide fraction which is discarded as final process residue. The elemental sulphur-sulphides fraction is further treated to separate the sulphur from the sulphides and the latter is recycled to the pressure leaching step where it behaves like the fresh sulphides fed to the leaching step while the former constitutes a by-product of the process.

Whereas the process just described has certain advantages over the earlier process of U.S. Pat. No. 2,996,440, it nonetheless has certain inherent disadvantages. One of these is that the operations involved in separating unleached sulphides from the leach residue and the elemental sulphur become uneconomic when the price of elemental sulphur is very low (as it frequently is) and/or where the residue does not contain other values, such as precious metals, in quantities sufficient to offset, at least in part, the cost of residue treatment. Another disadvantage is that all zinc sulphide concentrates are not equally amenable to the process. With some concentrates, it has been found that even under optimum conditions, the leaching reaction does not proceed to completion as rapidly as is desired with the result that an unduly long retention time is required to produce a solution with the desired zinc concentration and suitably low acid and dissolved iron concentrations.

The present invention provides a direct pressure leaching process which is effective for treating a wide variety of zinc-bearing sulphides to extract zinc and elemental sulphur with a high degree of extractive efficiency and without the attendant problems of the prior art processes as discussed above.

According to the invention, rapid and substantially complete extraction of zinc from zinc and iron containing sulphides is obtained by leaching the sulphides under oxidizing conditions at a temperature above the melting point of sulphur with an aqueous sulphuric acid solution containing at least the stoichiometric amount of acid required to combine with the zinc content of the sulphides as zinc sulphate and, also, containing an additive which is effective to prevent or at least substantially inhibit the molten sulphur from occluding unleached zinc sulphide particles thereby enabling the leaching reaction to continue until substantially all zinc values are extracted.

More specifically, the process of the invention involves the steps of dispersing finely divided iron containing zinciferous sulphides in an aqueous sulphuric acid solution to form a slurry; adjusting the relative amounts of acid and said sulphides in the slurry such that there is at least sufficient acid present to combine with the zinc content of said sulphides as zinc sulphate, providing in said slurry an effective amount of a surface active compound compatible with the acid sulphate leach solution which is operative under the reaction conditions of the following oxygen reaction step to render said sulphides wettable by aqueous acid solution in preference to molten sulphur, reacting the slurry with free oxygen bearing gas in a closed reaction vessel at a temperature above the melting point of sulphur but below that temperature at which any substantial portion of the sulphide sulphur is oxidized to sulphate form, continuing said reaction with active agitation to effect substantially complete extraction of zinc values from said sulphides as soluble zinc sulphate with concurrent conversion of sulphide sulphur associated with said zinc values to elemental form, and separating product leach solution containing dissolved zinc values from the undissolved residue.

At temperatures within the above stated range and by the use of suitable surface active compounds in the leach slurry, the leaching reaction proceeds at a rapid rate until substantially complete zinc extraction is obtained despite the fact that molten sulphur is present in the reaction vessel at the temperatures used. Although the product solution generally contains some free acid and a higher iron concentration than the solution of the process of U.S. Pat. No. 3,477,927 discussed hereinabove, the acid and iron can be readily lowered to desired levels simply by adding a suitable acid neutralizing reagent, such as calcined zinc sulphide, zinc oxide, lime or calcium carbonate to the leach end slurry or solution.

The process of this invention is applicable to either high or low grade material containing zinc-iron sulphides. However, the starting material normally will be a high grade zinc and iron containing sulphide concentrate obtained by selective froth flotation of zinc bearing sulphide ores. Such concentrates will often contain other non-ferrous metals in addition to zinc. For example, a typical sulphide concentrate may include some copper, lead, nickel and/or cobalt and cadmium. It is to be understood, therefore, that the use of the terms "iron containing zinciferous sulphides" or simply "sulphides" herein is intended to include such materials and is also intended to include any other high or low grade materials which contain iron, either as a naturally occurring or added constituent, and economically recoverable quantities of zinc in sulphide form.

In order to be amenable to treatment by the process of the invention, the sulphidic starting material must be in finely divided particulate form. The particle size of the sulphide has a very pronounced affect on the rate of reaction and the degree of zinc extraction in the acid oxidation leaching step. It is preferable, in order to realize the full benefits of the invention, that the starting material be at least 90 percent minus 325 mesh standard Tyler screen and, more preferably, at least 97 percent minus 325 mesh standard Tyler screen. Material such as flotation concentrates may, in some cases, already be within the preferred size range. Material not already of the preferred size is preferably first pulverized such as by wet grinding.

The sulphides, after pulverization if necessary, are slurried with a dilute aqueous sulphuric acid solution. Preferably, this is done on a continuous basis in a separate slurry make-up step in which the sulphides are dispersed in the acid solution at ambient temperature and pressure. Where the sulphides are iron-free or iron deficient, the iron content may conveniently be adjusted at this point by addition of oxidizable iron to the slurry. The oxidizable iron may be provided in the slurry in the form of finely divided iron particles or in the form of a compound which is capable of dissociation in the solution under oxidizing conditions to yield ferrous and/or ferric ions. The preferred iron additive compounds are ferric oxide, pyrrhotite and marmatite. Generally, the amount of iron or iron compound added should be sufficient to raise the total oxidizable iron content of the slurry to between about 5 and about 15 wt. percent of the zinc content, i.e. preferably there should be from about 1 to about 3 grams of oxidizable iron for every 20 grams of zinc in the slurry.

The amount of acid provided in the slurry make-up step is determined by the target zinc concentration desired in the final leach solution. Sufficient acid must be available to combine as zinc sulphate with zinc values contained in the sulphides to produce the desired target concentration of dissolved zinc. It is generally desirable to produce a leach solution containing about 140 to about 180 grams per litre (g.p.l.) of zinc since, in most cases, zinc will be recovered from the solution by electrolysis and a zinc concentration within this range is preferred for the electrolysis step. Once the desired zinc target concentration is determined, the amount of acid required to produce this concentration can readily be calculated having regard to the stoichiometric requirements of the zinc to be extracted as zinc sulphate. In most cases, the slurry make-up solution will be recycled liquor obtained from the zinc electrolysis step. This liquor will normally contain, in addition to residual zinc values, regenerated sulphuric acid equivalent to the amount of dissolved zinc metal recovered in elemental form. Accordingly, except for initial make-up acid, total acid requirements for the leaching step when conducted in conjunction with electrolytic zinc recovery, are limited to that amount needed to compensate for the mechanical losses and for that consumed by acid reactive diluent materials in the sulphides, such as lead, which form insoluble sulphates.

The acid-zinc molar ratio of the leach slurry must be adjusted such that there is at least 1 mole of acid per each mole of zinc. Preferably, there should be an excess of acid in the leach slurry over the amount required to combine stoichiometrically with all zinc values in the slurry to produce zinc sulphate. However, there is no need for a very large excess of acid since the reaction rate is not greatly increased by such excess and the amount of dissolved iron and free acid in the leach end solution will be undesirably high. Generally, the $H_2SO_4$:Zn molar ratio should be controlled in the range of about 1.0:1 to about 1.2:1, preferably 1.1:1.

The pulp density of the leach slurry, i.e. the relative quantities of sulphides and solution provided in the leaching step in any given case is determined having regard to the zinc content of the sulphides and the desired zinc concentration of the final leach solution. In general, it is desirable to operate at a pulp density within the range of about 15 percent to about 50 percent. The reaction rate decreases as pulp density is increased beyond the level where optimum dispersion of the solids and oxygen in the solution can be maintained and, of course, the overall efficiency of the process is reduced if the pulp density is too low.

According to the invention, it is essential to provide in the slurry treated in the subsequent oxidation step a surface active compound which is compatible with the aqueous acid sulphate solution and which is operative under the reaction conditions of the oxidation step to render zinc sulphide particles in the slurry wettable by the aqueous acid sulphate solution in preference to molten sulphur. In order to be "compatible with the aqueous acid sulphate" solution, the additive surface active compound must be one that does not introduce undesirable impurities into the slurry, e.g. it must not contain substances which will remain in the leach end solution and end up interferring with the subsequent electrolysis operation; it must be soluble in the acid sulphate solution and it must not enter into any reactions which alter the essential chemical nature of the constituents of the slurry, e.g. it must not neutralize the acid or form insoluble compounds with the zinc. A number of surface active compounds are known which are suitable for the purposes of the invention. These include organic compounds such as lignins, including mined lignins and lignosulphonates, particularly sodium and calcium lignosulphonate; tannin compounds, particularly tree bark extracts such as quebracho, hemlock and redwood extracts; and alkylaryl sulphonates, particularly sodium alkylbenzene sulphonates. The amount of surface active reagent added varies depending on the type of compound used and the specific conditions prevailing in each particular case. As a general rule, it is desirable for practical economic reasons to add the minimum amount of surface active compound that is effective to maximize zinc extraction in any given case. In most cases, the addition of from about 0.1 g.p.l. to about 1.0 g.p.l., preferably 0.1–0.3 g.p.l., of one or more of the additive compounds will be sufficient for purposes of the invention although lesser or greater amounts may be used in special cases. Although the precise manner in which the additive compounds function in the oxidation leach reaction is not clearly understood, it is believed that they help prevent, or at least substantially inhibit the coating of unreacted zinc sulphides with molten elemental sulphur thereby enabling the zinc leaching reaction to continue substantially to completion.

The leaching reaction is conducted at a temperature above the melting point of sulphur, i.e. above about 120°C. but below that temperature at which any substantial portion of the sulphur in the slurry is oxidized to sulphate form. Preferably, the operating temperature should be about 125°C. to about 175°C. At temperatures above about 150°C. sulphuric acid commences forming due to oxidation of the elemental sulphur. It should be noted, however, that generation of some acid may be desirable in some cases to compensate for mechanical acid losses and to replace make-up acid consumed by diluent metals such as lead and gangue materials such as calcium and magnesium. The leaching reaction is exothermic and produces enough heat to maintain the slurry within the preferred temperature range without addition of heat from an extraneous source once the reaction has been initiated.

The total pressure at which the leaching reaction is conducted is the pressure autogenously generated at the temperature of the oxidation reaction plus the overpressure of oxidizing gas. Preferably, the oxidizing gas is air but pure oxygen or oxygen enriched air may also be used. The reaction proceeds satisfactorily with an oxygen overpressure above about 5 pounds per square inch (p.s.i.). However, there is an improvement in zinc extraction rate as the oxygen overpressure is increased. Thus, it is preferred to use an overpressure of oxygen above about 20 p.s.i. and preferably about 25 to 50 p.s.i. The upper limit of oxygen pressure will be that imposed by the apparatus employed. As it is generally desirable to avoid the use of costly high pressure apparatus, generally the upper limit will be about 100 p.s.i. oxygen overpressure or about 500 p.s.i. air overpressure.

The leaching reaction is continued until substantially all the zinc has been extracted from the sulphides. The actual leaching time will vary for each case depending on the specific nature of the sulphides being treated, as well as the operating and equipment design details. In general, however, extraction of 95 to 98 percent of the zinc from the sulphides is obtained in about one and one-half to about three hours.

When leaching is completed, the final leach slurry is discharged from the leaching vessel into a flash tank and then is further flashed into a vessel at atmospheric pressure. The leach solution in the slurry discharged from the leaching vessel normally will contain approximately 125 to 180 g.p.l. zinc, 1.5–5.0 g.p.l. iron and 15–30 g.p.l. sulphuric acid. The leach solution containing the desired zinc concentration is separated from the undissolved residue in a conventional liquids-solid separation step and is passed to solution purification and zinc recovery operations. The zinc is recovered from the purified solution by electrolysis in the conventional manner and the spent liquor from the electrolysis operation which contains 1 mole of regenerated $H_2SO_4$ for each mole of elemental zinc recovered is recycled to provide make-up acid for the leaching step.

The precise purification steps will vary depending on the composition of the feed material and the purity specifications for the zinc recovery operation. In any case, the leach end solution will require treatment to neutralize the excess acid and precipitate iron. Preferably, this is done by contacting the solution with zinc calcine and oxygen to reduce the free acid content to about 1–5 g.p.l. and to precipitate iron. Other acid neutralizing reagents such as zinc oxide, lime or limestone may also be used where the circumstances warrant it.

Another method of neutralizing the residual free sulphuric acid before the leach solution is delivered to the purification circuit, is to inject zinc calcine or other neutralizing agents into the leaching vessel to raise the pH of the slurry to about 3 to precipitate iron before the leach slurry is discharged. Another alternative is to neutralize the free sulphuric acid after the leach slurry has been discharged from the pressure leaching vessel. In this procedure, the slurry is neutralized to a pH of about 5, preferably by adding calcine to it in an agitated neutralization tank.

The leach end residue separated from the zinc bearing solution contains elemental sulphur, gangue material, such as silica, and insoluble substances oxidized in the leaching reaction such as ferric hydroxide and basic ferric sulphate. This residue may be discharged into a storage pond or, if it is economically feasible to do so, it may be treated for the separate recovery of residual zinc values, the elemental sulphur and other values, such as precious metal values which may be present. A preferred procedure is to repulp the residue, after it is washed to remove substantially all soluble zinc values, in water and subject it to froth flotation. This produces a tailing composed of hydrated ferric oxide and gangue materials and a flotation concentrate containing the bulk of the elemental sulphur as well as any unleached sulphides such as $ZnS$, $CuFeS_2$ and $FeS$. This concentrate is then further treated to separate the elemental sulphur, e.g. by extraction with ammonium sulphide solution or by volatilization. The metal sulphides remaining after elemental sulphur extraction may be recycled to the leaching step or they may be passed to the roasting operation of a conventional zinc recovery plant. This latter procedure is preferred where the process of the invention is practiced in reasonable proximity to or in conjunction with a conventional zinc production operation wherein zinc sulphide concentrates are roasted under oxidizing conditions prior to leaching in dilute acid solution.

It is to be noted that it is possible in the practice of the present invention to obtain a final leach residue which contains only 3 percent or less of the zinc originally contained in the zinc sulphide concentrate fed to the leaching step. That is, an overall zinc extraction of 97 percent or better can be obtained and in such case it may not be necessary to treat the leach residue to have an economically viable process. This residue contains essentially all the sulphur originally contained in the zinc sulphide concentrate feed as elemental sulphur or tied up as $FeS_2$ and it can therefore be stored in a tailings pond without causing environmental pollution. Any water associated with the residue can be recycled to the leaching plant to be used for wash water or the like. The leach residue accumulated in the storage pond can be stored indefinitely or it can be reclaimed at any time it is found economically attractive to recover the elemental sulphur and/or other values from it.

The invention is further explained and illustrated by the following:

A series of tests was conducted to show the effect of different additive compounds and, also, to show the effect of fine grinding of the concentrate. For comparison purposes, two tests were conducted without the use of the additive compounds of the invention. Batch grinding was carried out with a laboratory size ceramic ball-mill. In each batch, 1 kg concentrate was slurred in 300 ml water and ground for the appropriate time. The ground concentrate was filtered and dried. The effect of grinding on screen analysis was as follows:

| Grinding Time (Minutes) | + 200 mesh (%) | −200 + 325 mesh (%) | −325 mesh (%) |
|---|---|---|---|
| None | 24.4 | 18.6 | 57.0 |
| 50 | 0.4 | 8.0 | 91.6 |
| 100 | 0.0 | 1.2 | 98.8 |

In each test, 982 g. of ground ZnS concentrate and 5.0 l. of synthetic return electrolyte containing the additive compound were introduced into a 2.5 gallon, lead-lined autoclave, and heated with agitation and a slight oxygen partial pressure to 150°C. The synthetic return electrolyte analyzed: Zn – 50 g.p.l., $H_2SO_4$ – 150 g.p.l., and $S_T$ (total sulphur) – 73.6 g.p.l. and the ZnS concentrate analyzed: Zn – 48.5%, Fe – 13.5 percent and $S_T$ – 33.7 percent.

The oxygen partial pressure was adjusted to 30 p.s.i. and the conditions were maintained for 60 minutes. At the end of this period, the autoclave was cooled rapidly to ambient temperature and the reaction products were discharged. The products were washed through a 100 mesh screen to separate any sulphur/sulphide pellets. The undersize slurry was filtered and the undersize solids were washed by repulping with water and refiltering. The oversize and undersize solids were separately dried, weighed and sampled for analysis. The filtered solutions, including all the wash water, were combined and the combined volume was measured; this solution was sampled for analysis.

The results of the tests are shown in the following table:

| Test No. | Grinding Time (Mins.) | Additive Compound (g.p.l.) | Solution Composition g.p.l. | | | Zinc Extraction % |
|---|---|---|---|---|---|---|
| | | | Zn | $Fe_T$ | $H_2SO_4$ | |
| 1 | 0 | 0 | 98.5 | 6.60 | 62.5 | 54.4 |
| 2 | 0 | 0.1 calcium lignosulphonate + 0.2 quebracho | 131.3 | 9.50 | 7.48 | 90.0 |
| 3 | 50 | 0.1 calcium lignosulphonate + 0.2 quebracho | 141.7 | 1.84 | 12.8 | 97.5 |
| 4 | 100 | 0 | 106.7 | 8.38 | 46.5 | 63.3 |
| 5 | 100 | 0.1 calcium lignosulphonate + 0.2 quebracho | 139.7 | 1.91 | 18.0 | 97.8 |
| 6 | 100 | 0.1 calcium lignosulphonate | 140.9 | 2.57 | 18.4 | 95.9 |
| 7 | 100 | 0.2 quebracho | 140.7 | 2.11 | 11.9 | 97.8 |
| 8 | 100 | 0.2 ammonium lignosulphonate | 134.4 | 1.48 | 15.0 | 96.9 |
| 9 | 100 | 0.2 "Naccotan A"* | 128.2 | 2.19 | 14.5 | 96.0 |

*"Naccotan A" is the brand name of an alkylaryl sodium sulphonate sold by The Industrial Chemicals Division, Allied Chemicals Corporation.

The results in the foregoing table clearly show the striking effect of the additive compounds in the process of the invention. For coarser concentrate Zn extraction was increased from 54.4 to 90.0 percent by the addition of 0.1 g.p.l. calcine lignosulphonate and 0.2 g.p.l. quebracho (Test 2). For the finely ground material, the addition of 0.2 g.p.l. quebracho alone increased Zn extraction from 63.3 to 97.8 percent (Test 5). Similar results are produced with the other additive compounds listed in the Table.

The process of the present invention possesses a number of important advantages over the prior art methods. Not only is the desired zinc sulphate solution produced directly by leaching without concomitant production of sulphur dioxide or other noxious pollutants but the solution can be produced rapidly in a single stage leaching operation using relatively inexpensive, low pressure equipment with no corrosion problems. Zinc recoveries equal to or higher than those obtainable by the previously known acid leaching processes are obtained but with greatly decreased leach retention times and equipment requirements. The process may be employed to particular advantage in conjunction with a conventional zinc recovery facility for purposes of expanding the capacity of the facility or for replacing at least part of the fume producing roasting operations.

The solution from the direct leaching process may be passed directly to the purification circuit of the conventional plant for neutralization and iron precipitation with calcine from the roasting operation. Sulphur associated with the feed material treated in the direct pressure leach operation is converted to elemental form rather than sulphuric acid as the case would be if it were treated in the conventional plant, thus lending more flexibility to the sulphur disposal than is the case when all the sulphur is recovered as sulphuric acid.

What we claim as new and desire to protect by Letters Patent of the United States is:

1. The process for extracting zinc from iron containing zinciferous mineral sulphides which comprises the steps of dispersing finely divided iron containing zinciferous sulphides in an aqueous sulphur acid solution to form a slurry; adjusting the relative amounts of acid and said sulphides in the slurry such that there is at least sufficient acid present to combine with the zinc content of said sulphides as zinc sulphate, providing in said slurry an effective amount of a surface active compound compatible with the acid sulphate leach solution which is operative, under the reaction conditions of the following oxygen reaction step, to render said sulphides wettable by aqueous acid solution in preference to molten sulphur, reacting the slurry with free oxygen bearing gas in a closed reaction vessel at a temperature above the melting point of sulphur but below that temperature at which any substantial portion of the sulphide sulphur is oxidized to sulphate form, continuing said reaction with active agitation to effect substantially complete extraction of zinc values from said sulphides as soluble zinc sulphate with concurrent conversion of sulphide sulphur associated with said zinc values to elemental form, and separating product leach solution containing dissolved zinc values from the undissolved residue.

2. The process according to claim 1 wherein the leached slurry is treated with oxygen and an acid neutralizing reagent to lower the free acid content thereof to about 1.5 g.p.l. and to precipitate dissolved iron therefrom.

3. The process according to claim 2 wherein the acid neutralizing reagent is calcined zinc sulphide concentrate.

4. The process according to claim 3 wherein the calcined zinc sulphide concentrate is added to the leach end slurry prior to its discharge from the reaction vessel.

5. The process according to claim 1 wherein said surface active compound is at least one member of the group consisting of lignins, lignosulphonates, tannins and alkylaryl sulphonates.

6. The process according to claim 5 wherein from about 0.1 to about 1.0 g.p.l. of said compound is added to said slurry.

7. The process according to claim 1 wherein the acid to zinc molar ratio in said slurry is adjusted to between about 1.0:1 and about 1.2:1 and said reaction with free oxygen bearing gas is carried out at a temperature within the range of about 125°C. to about 175°C. under an oxygen partial pressure between about 5 p.s.i. and about 100 p.s.i.

8. The process according to claim 7 wherein the acid to zinc molar ratio is maintained at about 1.1:1, the temperature at about 150°C. and the oxygen partial pressure between about 25 and about 50 p.s.i.

9. The process according to claim 5 wherein said surface active compound is quebracho.

10. The process according to claim 5 wherein said surface active compound is calcium lignosulphonate.

11. The process according to claim 5 wherein said surface active compound is sodium lignosulphonate.

12. The process according to claim 5 wherein said surface active compound is ammonium lignosulphonate.

13. The process according to claim 5 wherein said surface active compound is an arylalkyl sodium sulphonate.

14. The process according to claim 1 wherein the dissolved zinc is recovered from the leach solution by electrolysis and the electrolysed solution is recycled to the slurry forming step.

* * * * *